United States Patent [19]

Peleg et al.

[11] Patent Number: 5,677,862

[45] Date of Patent: Oct. 14, 1997

[54] METHOD FOR MULTIPLYING PACKED DATA

[75] Inventors: Alexander Peleg; Yaakov Yaari, both of Haifa, Israel; Millind Mittal, South San Francisco; Larry M. Mennemeier, Boulder Creek, both of Calif.; Benny Eitan, Haifa, Israel

[73] Assignee: Intel Corporation, Santa Clara, Calif.

[21] Appl. No.: 630,876

[22] Filed: Apr. 2, 1996

Related U.S. Application Data

[63] Continuation of Ser. No. 349,559, Dec. 1, 1994, abandoned.

[51] Int. Cl.$^6$ .............. G06F 7/38; G06F 7/52; G06F 9/30
[52] U.S. Cl. .............. 364/754; 364/749; 395/375
[58] Field of Search .................. 364/725, 726, 364/736, 749, 754, 757, 758, 760

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,187,679 | 2/1993 | Vassiliadis et al. | 364/786 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992) pp. 1–4.

*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

*TM320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA-RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 94), pp. 12–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

*Primary Examiner*—Chuong D. Ngo
*Attorney, Agent, or Firm*—Blakely, Sokoloff, Taylor & Zafman

[57] ABSTRACT

A processor. The processor includes a decoder being coupled to receive a control signal. The control signal has a first source address, a second source address, a destination address, and an operation field. The first source address corresponds to a first location. The second source address corresponds to a second location. The destination address corresponds to a third location. The operation field indicates that a type of packed data multiply operation is to be performed. The processor further includes a circuit being coupled to the decoder. The circuit is for multiplying a first packed data being stored at the first location with a second packed data being stored at the second location. The circuit is further for communicating a corresponding result packed data to the third location.

8 Claims, 10 Drawing Sheets

FIG. 4c

```
63                                              16 15                          0
000 ---------------------------------------- 000 | wwww wwww wwww wwww |
```
Unsigned Word In-register Representation 412

```
63                                              16 15                          0
sss ----------------------------------------- sss | swww wwww wwww wwww |
```
Signed Word In-register Representation 413

FIG. 4d

```
63                                              32 31                          0
000 ------------------------------ 000 | dddd dddd dddd dddd dddd dddd dddd dddd |
```
Unsigned Doubleword In-register Representation 414

```
63                                              32 31                          0
sss ------------------------------- sss | sddd dddd dddd dddd dddd dddd dddd dddd |
```
Signed Doubleword In-register Representation 415

FIG. 5c

| 63 | 48 | 47 | 32 | 31 | 16 | 15 | 0 |
|---|---|---|---|---|---|---|---|
| wwww wwww wwww wwww | | wwww wwww wwww wwww | | wwww wwww wwww wwww | | wwww wwww wwww wwww | |

Unsigned Packed Word In-register Representation 512

| 63 | 48 | 47 | 32 | 31 | 16 | 15 | 0 |
|---|---|---|---|---|---|---|---|
| swww wwww wwww wwww | | swww wwww wwww wwww | | swww wwww wwww wwww | | swww wwww wwww wwww | |

Signed Packed Word In-register Representation 513

FIG. 5d

| 63 | 32 | 31 | 0 |
|---|---|---|---|
| dddd dddd dddd dddd　dddd dddd dddd dddd | | dddd dddd dddd dddd　dddd dddd dddd dddd | |

Unsigned Packed Doubleword In-register Representation 514

| 63 | 32 | 31 | 0 |
|---|---|---|---|
| sddd dddd dddd dddd　dddd dddd dddd dddd | | sddd dddd dddd dddd　dddd dddd dddd dddd | |

Signed Packed Doubleword In-register Representation 515

METHOD FOR MULTIPLYING PACKED DATA

This is a continuation/divisional of application Ser. No. 08/349,559, filed Dec. 1, 1994 now abandoned.

BACKGROUND OF THE INVENTION

1. Field of the Invention

The present invention includes an apparatus and method of performing arithmetic operations using a single control signal to manipulate multiple data elements. The present invention allows execution of multiply operations on packed data types.

2. Description of Related Art

Today, most personal computer systems operate with one instruction to produce one result. Performance increases are achieved by increasing execution speed of instructions and the processor instruction complexity; known as Complex Instruction Set Computer (CISC). Such processors as the Intel 80286™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported cooperation (CSC—the integration of teleconferencing with mixed media data manipulation), 2D/3D graphics, image processing, video compression/decompression, recognition, algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image) but have much wider data busses and registers. Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

SUMMARY OF THE INVENTION

A microprocessor (or processor) having an improved data comparison operation is described.

The processor includes a decoder being coupled to receive a control signal. The control signal has a first source address, a second source address, a destination address, and an operation field. The first source address corresponds to a first location. The second source address corresponds to a second location. The destination address corresponds to a third location. The operation field indicates that a type of packed data multiply operation is to be performed. The processor further includes a circuit being coupled to the decoder. The circuit is for multiplying a first packed data being stored at the first location with a second packed data being stored at the second location. The circuit is further for communicating a corresponding result packed data to the third location.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

FIG. 4b, FIG. 4c and FIG. 4d illustrate in-register integer data representations.

FIG. 5b, FIG. 5c and FIG. 5d illustrate in-register packed data representations.

DESCRIPTION OF THE PREFERRED EMBODIMENT

OVERVIEW OF ONE EMBODIMENT OF THE PRESENT INVENTION

A processor having multiply operations that operate on multiple data elements is described. In the following description, numerous specific details are set forth such as circuits, etc., in order to provide a thorough understanding of the present invention. In other instances, well-known structures and techniques have not been shown in detail in order not to unnecessarily obscure the present invention.

Definitions

To provide a foundation for understanding the description of the embodiments of the present invention, the following definitions are provided.

Bit X through Bit Y:
  defines a subfield of binary number. For example, bit six through bit zero of the byte $00111010_2$ (shown in base two) represent the subfield $111010_2$. The '$_2$' following a binary number indicates base 2. Therefore, $1000_2$ equals $8_{10}$, while $F_{16}$ equals $15_{10}$.

$R_x$:
  is a register. A register is any device capable of storing and providing data. Further functionality of a register is described below. A register is not necessarily part of the processor's package.

DEST: is a data address.

SRC1: is a data address.

SRC2: is a data address.

Result: is the data to be stored in the register addressed by DEST.

Source1: is the data stored in the register addressed by SRC1.

Source2: is the data stored in the register addressed by SRC2.

COMPUTER SYSTEM

Figure 1:
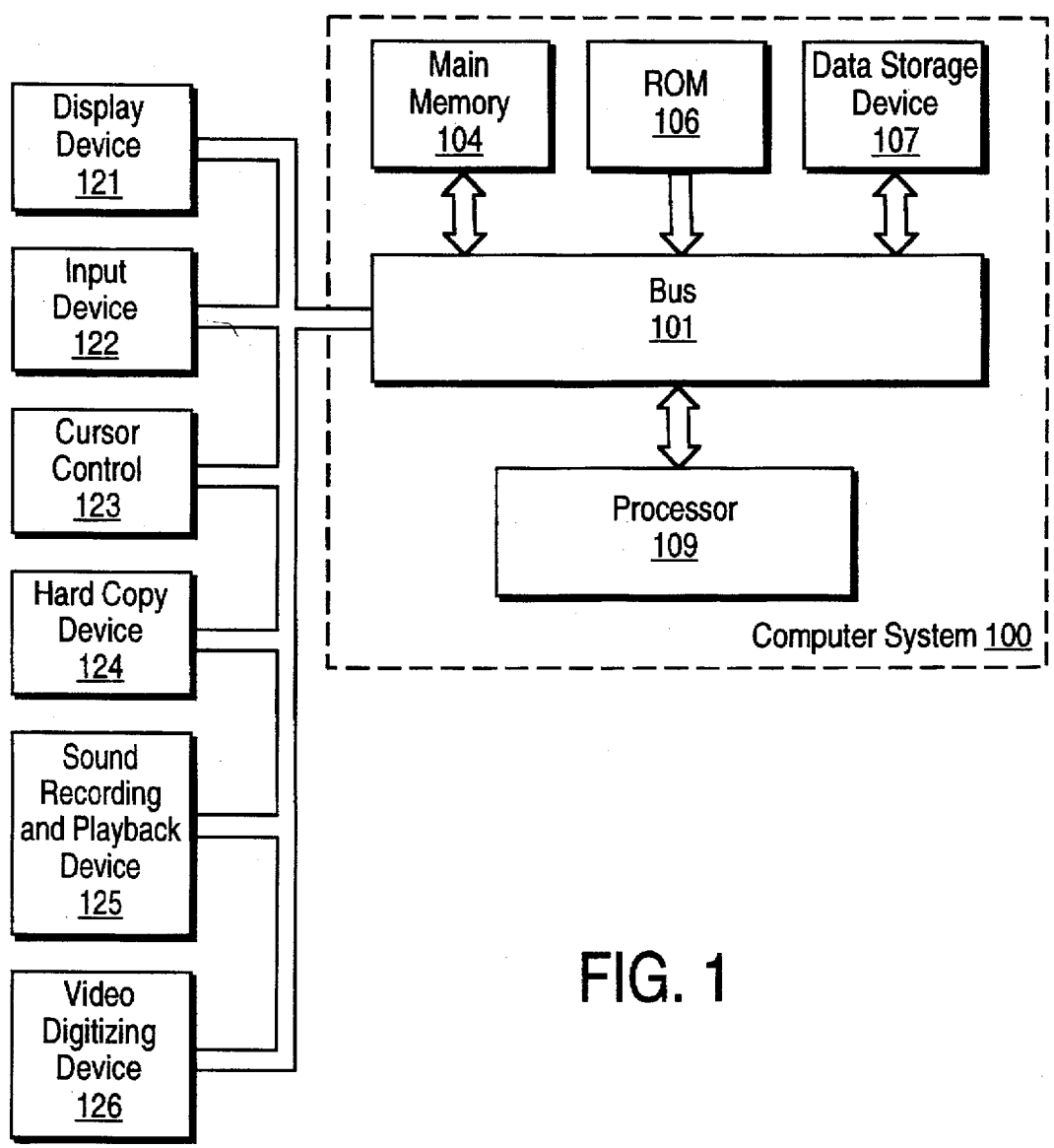
FIG. 1 illustrates an embodiment of the computer system using the methods and apparatus of the present invention.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images that can be transmitted to others on the computer network.

Computer system 100 is useful for supporting computer supported cooperation (CSC—the integration of teleconferencing with mixed media data manipulation), 2D/3D graphics, image processing, video compression/decompression, recognition algorithms and audio manipulation.

PROCESSOR

Figure 2:
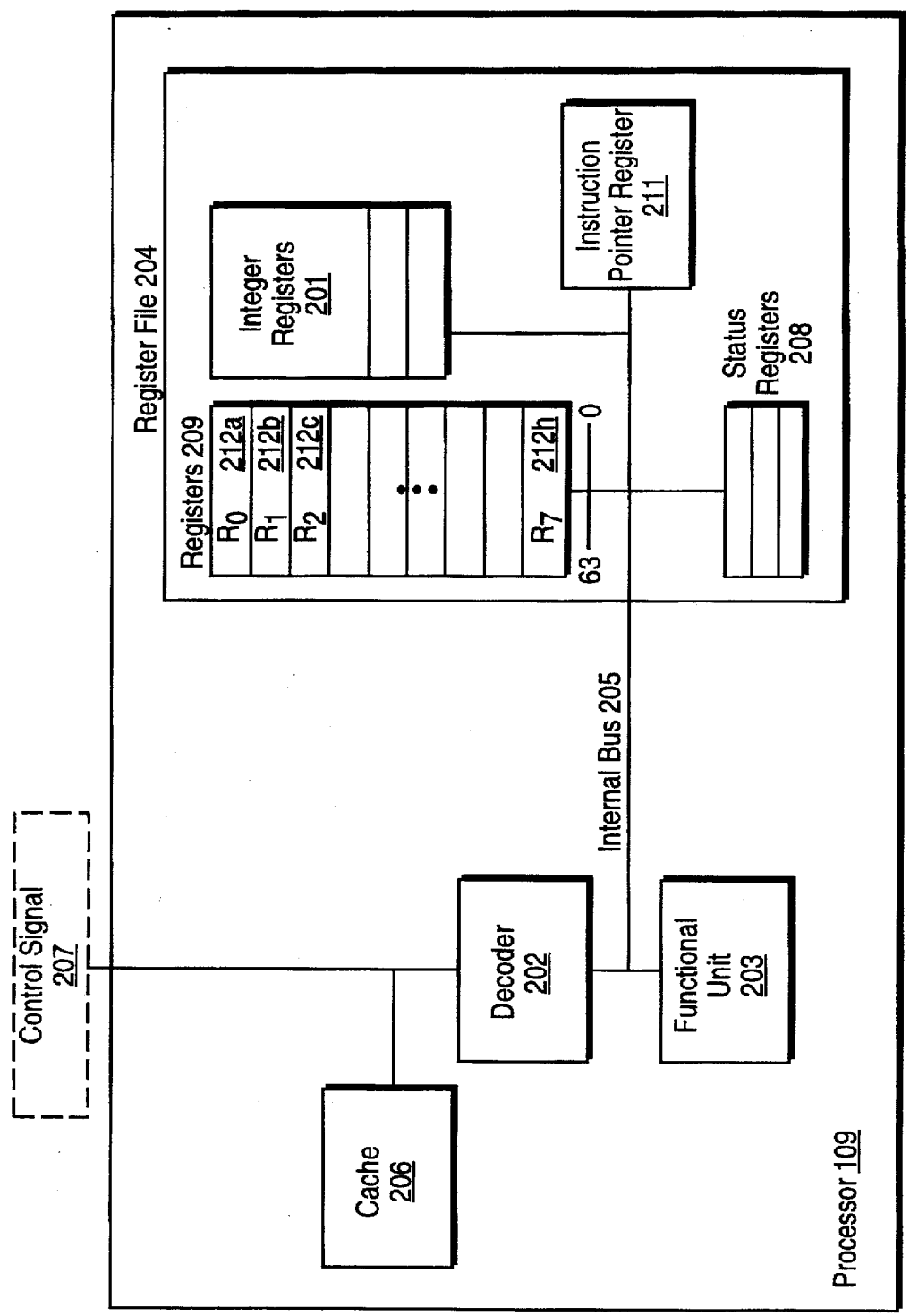
FIG. 2 illustrates an embodiment of the processor of the present invention.

FIG. 2 illustrates a detailed diagram of processor 109. Processor 109 can be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight registers, $R_0$ 212a through $R_7$ 212h. Each register in registers 209 is sixty-four bits in length. $R_1$ 212a, $R_2$ 212b and $R_3$ 212c are examples of individual registers in registers 209. Thirty-two bits of a register in registers 209 can be moved into an integer register in integer registers 201. Similarly, an value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are sixty-four bits in length and integers are represented as sixty-four bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Figure 3:
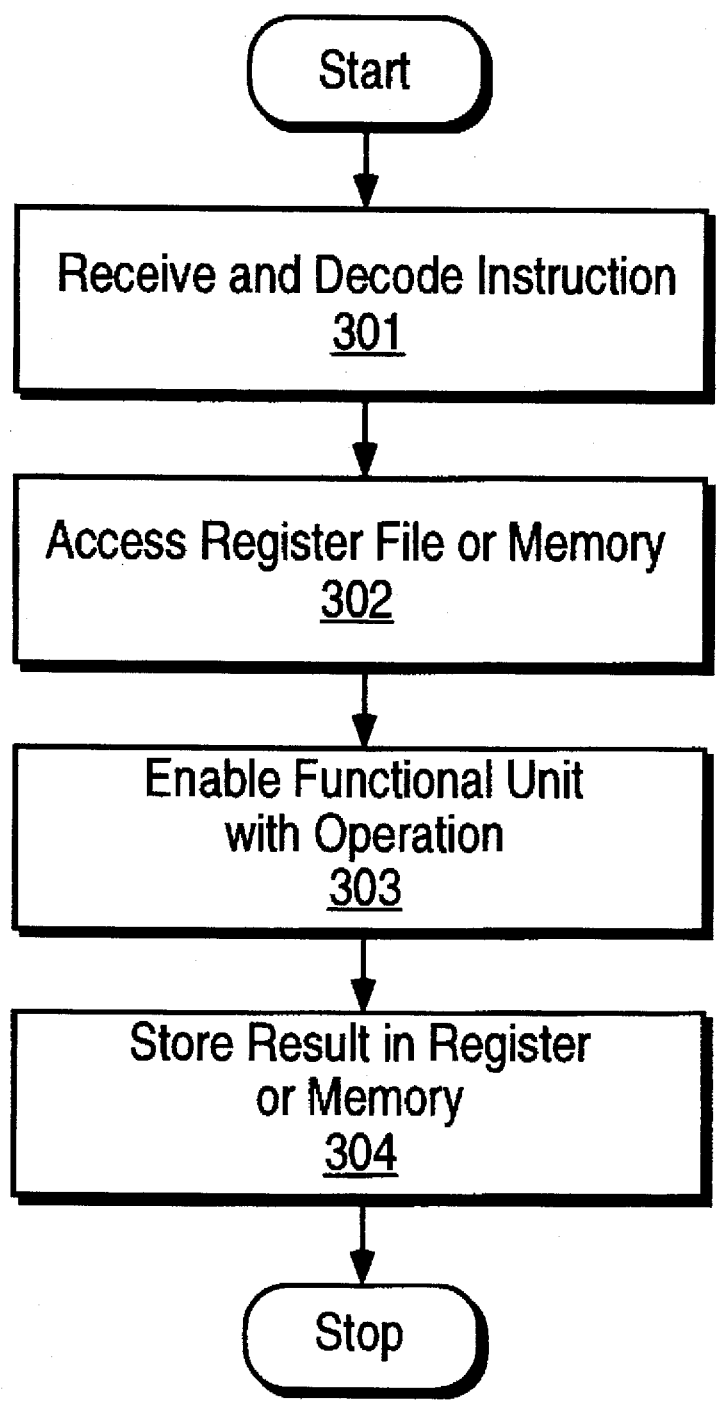
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, read only memory (ROM) 106, or data storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium™ processor, the Intel 80486™ processor, the 80386™ processor, the Intel 80286™ processor, and the Intel 8086™ processor, all available from Intel Corporation of Santa Clara, Calif. In another embodiment of the present invention, processor 109 supports all the operations supported in the IA™. Intel Architecture, as defined by Intel Corporation of Santa Clara, Calif. (see Microprocessors. Intel Data Books volume 1 and volume 2, 1992 and 1993, available from Intel of Santa Clara, Calif.). Generally, processor 109 can support the present instruction set for the Pentium™ processor, but can also be modified to incorporate future instructions, as well as those described herein. What is important is that general processor 109 can support previously used operations in addition to the operations described herein.

At step 301, the decoder 202 receives a control signal 207 from either the cache 206 or bus 101. Decoder 202 decodes the control signal to determine the operations to be performed.

Decoder 202 accesses the register file 204, or a location in memory, at step 302. Registers in the register file 204, or memory locations in the memory, are accessed depending on the register address specified in the control signal 207. For example, for an operation on packed data, control signal 207 can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the present invention, any one, or all, of SRC1, SRC2 and DEST, can define a memory location in the addressable memory space of processor 109. For example, SRC1 may identify a memory location in main memory 104 while SRC2 identifies a first register in integer registers 201, and DEST identifies a second register in registers 209. For simplicity of the description herein, references are made to the accesses to the register file 204, however, these accesses could be made to memory instead.

In another embodiment of the present invention, the operation code only includes two addresses, SRC1 and SRC2. In this embodiment, the result of the operation is stored in the SRC1 or SRC2 register. That is SRC1 (or SRC2) is used as the DEST. This type of addressing is compatible with previous CISC instructions having only two addresses. This reduces the complexity in the decoder 202. Note, in this embodiment, if the data contained in the SRC1 register is not to be destroyed, then that data must first be copied into another register before the execution of the operation. The copying would require an additional instruction. To simplify the description herein, the three address addressing scheme will be described (i.e. SRC1, SRC2, and DEST). However, it should be remembered that the control signal, in one embodiment, may only include SRC1 and SRC2, and that SRC1 (or SRC2) identifies the destination register.

Where the control signal requires an operation, at step 303, functional unit 203 will be enabled to perform this operation on accessed data from register file 204. Once the operation has been performed in functional unit 203, at step 304, the result is stored back into register file 204 according to requirements of control signal 207.

DATA AND STORAGE FORMATS

Figure 4A:
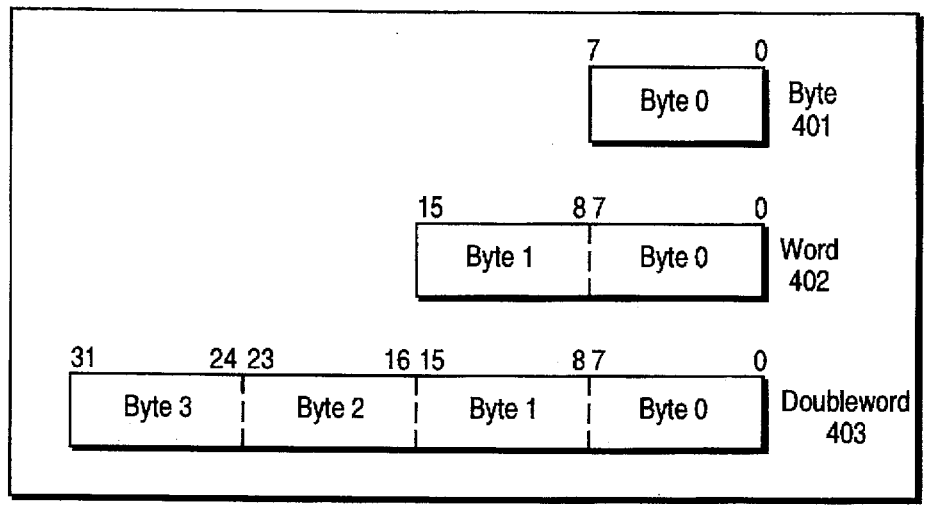
FIG. 4a illustrates memory data types.

FIG. 4a illustrates some of the data formats as may be used in the computer system of FIG. 1. These data formats are fixed point. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte $00111010_2$ (shown in base 2) represent the subfield $111010_2$.

Figure 4B:
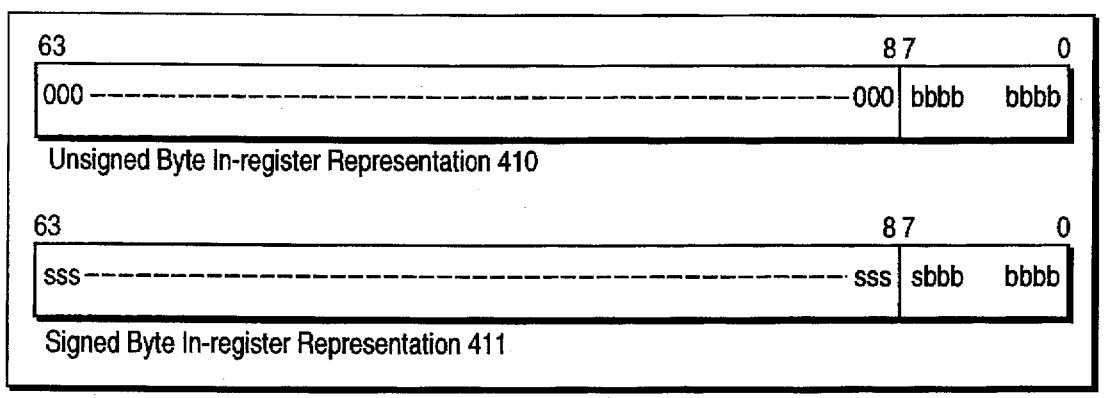

FIG. 4b through FIG. 4d illustrate in-register representations used in one embodiment of the present invention. For example, unsigned byte in-register representation 410 can represent data stored in a register in integer registers 201. In one embodiment, a register, in integer registers 201, is sixty-four bits in length. In another embodiment, a register, in integer registers 201, is thirty-two bits in length. For the simplicity of the description, the following describes sixty-four bit integer registers, however, thirty-two bit integer registers can be used.

Unsigned byte in-register representation 410 illustrates processor 109 storing a byte 401 in integer registers 201, the first eight bits, bit seven through bit zero, in that register are dedicated to the data byte 401. These bits are shown as {b}. To properly represent this byte, the remaining 56 bits must be zero. For an signed byte in-register representation 411, integer registers 201 store the data in the first seven bits, bit six through bit zero, to be data. The seventh bit represents the sign bit, shown as an {s}. The remaining bit sixty-three through bit eight are the continuation of the sign for the byte.

Unsigned word in-register representation 412 is stored in one register of integer registers 201. Bit fifteen through bit zero contain an unsigned word 402. These bits are shown as {w}. To properly represent this word, the remaining bit sixty-three through bit sixteen must be zero. A signed word 402 is stored in bit fourteen through bit zero as shown in the signed word in-register representation 413. The remaining bit sixty-three through bit fifteen is the sign field.

A doubleword 403 can be stored as an unsigned doubleword in-register representation 414 or a signed doubleword in-register representation 415. Bit thirty-one through bit zero of an unsigned doubleword in-register representation 414 are the data. These bits are shown as {d}. To properly represent this unsigned doubleword, the remaining bit sixty-three through bit thirty-two must be zero. Integer registers 201 stores a signed doubleword in-register representation 415 in its bit thirty through bit zero; the remaining bit sixty-three through bit thirty-one are the sign field.

As indicated by the above FIG. 4b through FIG. 4d, storage of some data types in a sixty-four bit wide register is an inefficient method of storage. For example, for storage of an unsigned byte in-register representation 410 bit sixty-three through bit eight must be zero, while only bit seven through bit zero may contain non-zero bits. Thus, a processor storing a byte in a sixty-four bit register uses only 12.5% of the register's capacity. Similarly, only the fast few bits of operations performed by functional unit 203 will be important.

Figure 5A:
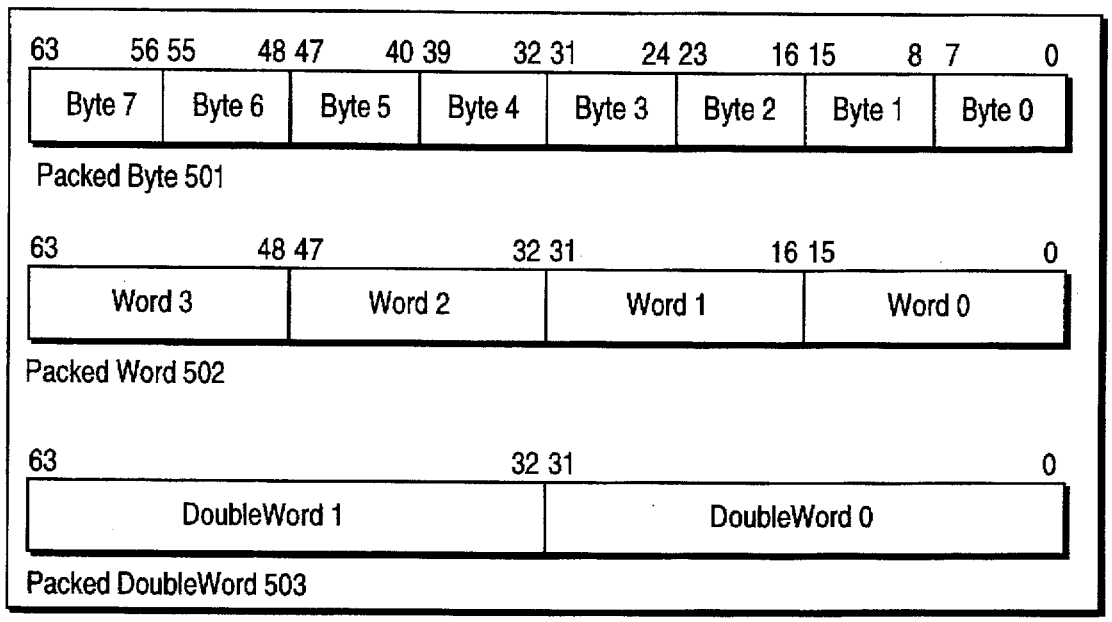
FIG. 5a illustrates packed data-types.

FIG. 5a illustrates the data formats for packed data. Three packed data formats are illustrated; packed byte 501, packed word 502, and packed doubleword 503. Packed byte, in one embodiment of the present invention, is sixty-four bits long containing eight data elements. Each data element is one byte long. Generally, a data element is an individual piece of data that is stored in a single register (or memory location) with other data elements of the same length. In one embodiment of the present invention, the number of data elements stored in a register is sixty-four bits divided by the length in bits of a data element.

Packed word 502 is sixty-four bits long and contains four word 402 data elements. Each word 402 data element contains sixteen bits of information.

Packed doubleword 503 is sixty-four bits long and contains two doubleword 403 data elements. Each doubleword 403 data element contains thirty-two bits of information.

Figure 5B:
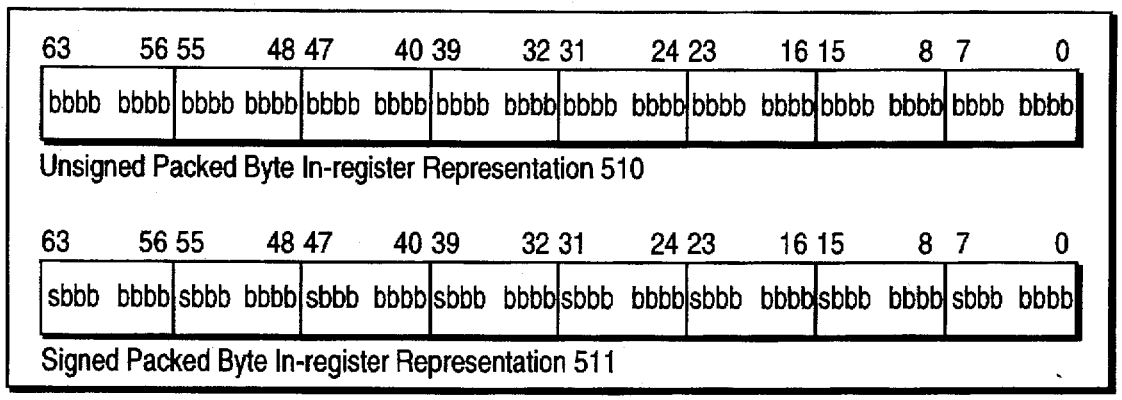

FIG. 5b through FIG. 5d illustrate the in-register packed data storage representation. Unsigned packed byte in-register representation 510 illustrates the storage of packed byte 501 in one of the registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 is similarly storm in a register in registers 209. Note that only the eighth bit of every byte data element is the necessary sign bit; other bits may or may not be used to indicate sign.

Unsigned packed word in-register representation 512 illustrates how word three through word zero are storm in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the necessary sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and integer data. In this embodiment of the present invention, the individual programming processor 109 may be required to track whether an addressed register, $R_1$ 212a for example, is storing packed data or simple integer/fixed point data. In an alternative embodiment, processor 109 could track the type of data stored in individual registers of registers 209. This alternative embodiment could then generate errors if, for example, a packed addition operation were attempted on simple/fixed point integer data.

CONTROL SIGNAL FORMATS

The following describes one embodiment of control signal formats used by processor 109 to manipulate packed data. In one embodiment of the present invention, control signals are represented as thirty-two bits. Decoder 202 may receive control signal 207 from bus 101. In another embodiment, decoder 202 can also receive such control signals from cache 206.

Figure 6A:
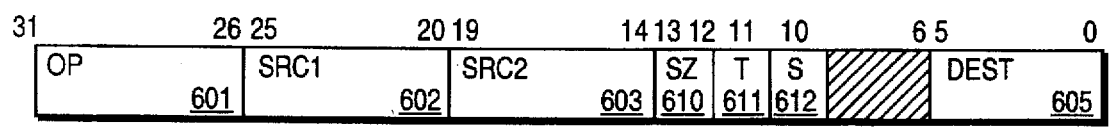
FIG. 6a illustrates a control signal format used in the computer system to indicate the use of packed data.

FIG. 6a illustrates a general format for a control signal operating on packed data. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 501. If SZ 610 equals $10_2$, then the packed data is formatted as packed word 502. SZ 610 equaling $00_2$ or $11_2$ is reserved, however, in another embodiment, one of these values could be used to indicate packed doubleword 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
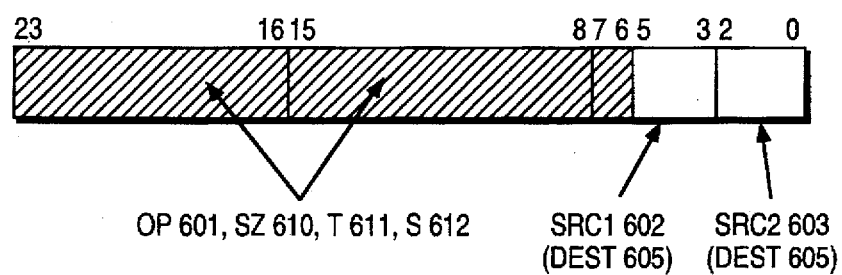
FIG. 6b illustrates a second control signal format that can be used in the computer system to indicate the use of packed data.

FIG. 6b illustrates a second general format for a control signal operating on packed data. This format corresponds with the general integer opcode format described in the "Pentium™ Processor Family User's Manual," available from Intel Corporation, Literature Sales, P.O. Box 7641, Mt. Prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal.

This is described in more detail in the "Pentium™ Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

DESCRIPTION OF SATURATE/UNSATURATE

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

MULTIPLY OPERATION

In one embodiment of the present invention, the performance of CSC applications is improved by not only supporting a standard CISC instruction set (unpacked data operations), but by supporting a multiply operation on packed data. The packed multiply can be used to increase the speed of Fast Fourier Transforms, Cosine Transforms, and other digital/image signal processing algorithms.

In one embodiment of the present invention, the SRC1 register contains multiplicand data (Source1) the SRC2 register contains multiplier data (Source2), and DEST register will contain a portion of the product of the multiplication (Result). That is, Source1 will have each data element independently multiplied by the respective data element of Source2. Depending on the type of the multiply, the Result will include the high order or the low order bits of the product.

In one embodiment of the present invention, the following multiply operations are supported: multiply high unsigned packed, multiply high signed packed and multiply low packed. High/low indicate which bits from the product of the multiplication are to be included in the Result. This is needed because a multiplication of two N bit numbers results in a product having 2N bits. As each result data element is the same size as the multiplicand and the multiplier's data elements, only half of the product can be represented by the result. High causes the higher order bits to be output as the result. Low causes the low order bits to be output as the result. For example, Source1[7:0] is unsigned high multiplied by Source2[7:0] gives the high order bits of the product to be the result Result[7:0].

In one embodiment of the present invention, the use of the high/low operation modifier removes the possibility of an overflow from one data element into the next higher data element. That is, this modifier allows the programmer to select which bits of the product are to be in the result without concern for overflows. The programmer can generate a complete 2N bit product using a combination of packed multiply operations. For example, the programmer can use a multiply high unsigned packed operation and then, using the same Source1 and Source2, a multiply low packed operation to obtain complete (2N) products. The multiply high operation is provided because, often, the high order bits of the product are the only important part of the product. The programmer can obtain the high order bits of the product without first having to perform any truncation, as is often required by a nonpacked data operation.

In one embodiment of the present invention, each data element in Source2 can have a different value. This provides the programmer with the flexibility to have a different value as the multiplier for each multiplicand in Source1.

Figure 7:
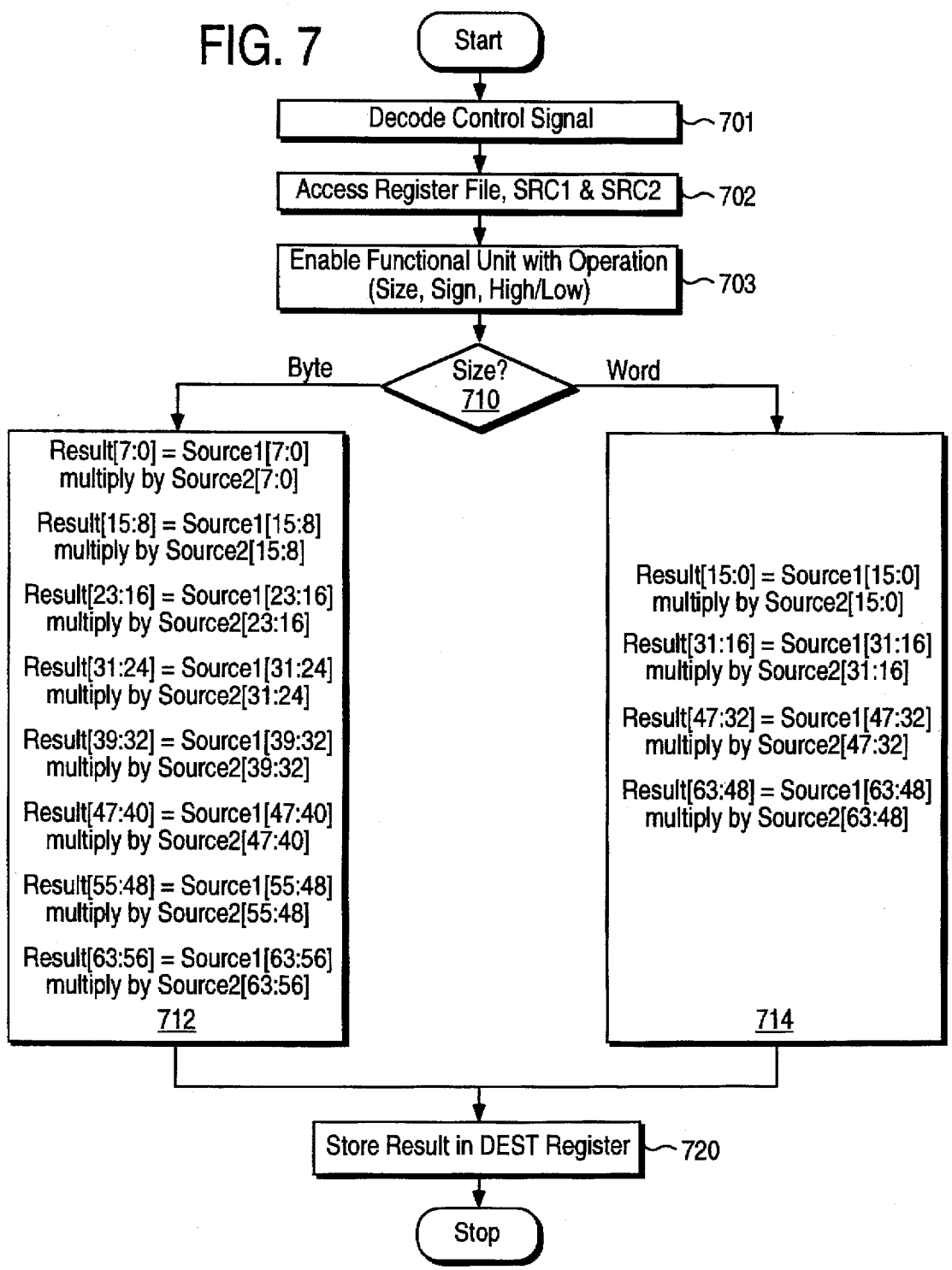
FIG. 7 illustrates one embodiment of a method followed by a processor when performing a multiply operation on packed data.

FIG. 7 illustrates one embodiment of a method of performing a multiply operation on packed data. This embodiment can be implemented in the processor 109 of FIG. 2.

At step 701, decoder 202 decodes control signal 207 received by processor 109. Thus, decoder 202 decodes: the operation code for the appropriate multiply operation; SRC1 602, SRC2 603 and DEST 605 addresses in integer registers 209; signed/unsigned, high/low, and length of the data elements in the packed data.

At step 702, via internal bus 205, decoder 202 accesses integer registers 209 in register file 204 given the SRC1 602 and SRC2 603 addresses: Integer registers 209 provides functional unit 203 with the packed data stored in the SRC1 602 register (Source1), and the packed data stored in SRC2 603 register (Source2). That is, integer registers 209 communicate the packed data to functional unit 203 via internal bus 205.

At step 703, decoder 202 enables functional unit 203 to perform the appropriate packed multiply operation. Decoder 202 further communicates, via internal bus 205, the size of data elements and the high/low for the multiply operation.

At step 710, the size of the data element determines which step is to be executed next. If the size of the data elements is eight bits (byte data), then functional unit 203 performs step 712. However, if the size of the data elements in the packed data is sixteen bits (word data), then functional unit 203 performs step 714. In one embodiment, only sixteen bit data element size packed multiplies are supported. In another embodiment, eight bit and sixteen bit data element size packed multiplies are supported. However, in another embodiment, a thirty-two bit data element size packed multiply is also supported.

Assuming the size of the data elements is eight bits, then step 712 is executed. In step 712, the following is performed. Source1 bits seven through zero are multiplied by Source2 bits seven through zero generating Result bits seven through zero. Source1 bits fifteen through eight are multiplied by Source2 bits fifteen through eight generating Result bits fifteen through eight. Source1 bits twenty-three through sixteen are multiplied by Source2 bits twenty-three through sixteen generating Result bits twenty-three through sixteen. Source 1 bits thirty-one through twenty-four are multiplied by Source2 bits thirty-one through twenty-four generating Result bits thirty-one through twenty-four. Source1 bits thirty-nine through thirty-two are multiplied by Source2 bits thirty-nine through thirty-two generating Result bits thirty-nine through thirty-two. Source1 bits forty-seven through forty are multiplied by Source2 bits forty-seven through forty generating Result forty-seven through forty. Source1 bits fifty-five through forty-eight are multiplied by Source2 bits fifty-five through forty-eight generating Result bits fifty-five through forty-eight. Source1 bits sixty-three through fifty-six are multiplied by Source2 bits generating Result bits sixty-three through fifty-six.

Assuming the size of the data elements is sixteen bits, then step 714 is executed. In step 714, the following is performed. Source1 bits fifteen through zero are multiplied by Source2 bits fifteen through zero generating Result bits fifteen through zero. Source1 bits thirty-one through sixteen are multiplied by Source2 bits thirty-one through sixteen generating Result bits thirty-one through sixteen. Source1 bits forty-seven through thirty-two are multiplied by Source2 bits forty-seven through thirty-two generating Result bits forty-seven through thirty-two. Source1 bits sixty-three through forty-eight are multiplied by Source2 bits sixty-three through forty-eight generating Result bits sixty-three through forty-eight.

In one embodiment, the multiplies of step 712 are performed simultaneously. However, in another embodiment, these multiplies are performed serially. In another embodiment, some of these multiplies are performed simultaneously and some are performed serially. This discussion also applies to the multiplies of step 714 as well.

At step 720, the Result is stored in the DEST register.

Table 2 illustrates the in-register representation of packed multiply unsigned high operation on packed word data. The first row of bits is the packed data representation of Source1. The second row of bits is the data representation of Source2. The third row of bits is the packed data representation of the Result. The number below each data element bit is the data element number. For example, Source1 data element two is 11111111 00000000$_2$.

TABLE 2

| 11111111 11111111 | 11111111 00000000 | 11111111 00000000 | 00001110 00001000 |
|---|---|---|---|
| 3 | 2 | 1 | 0 |
| Multiply | Multiply | Multiply | Multiply |
| 00000000 00000000 | 00000000 00000001 | 10000000 00000000 | 00001110 10000001 |
| = | = | = | = |
| 00000000 00000000 | 00000000 00000000 | 01111111 10000000 | 00000000 11001011 |
| 3 | 2 | 1 | 0 |

Table 3 illustrates the in-register representation of multiply high signed packed operation on packed word data.

TABLE 3

| 11111111 11111111 | 11111111 00000000 | 11111111 00000000 | 00001110 00001000 |
|---|---|---|---|
| 3 | 2 | 1 | 0 |
| Multiply | Multiply | Multiply | Multiply |
| 00000000 00000000 | 00000000 00000001 | 10000000 00000000 | 00001110 10000001 |
| = | = | = | = |
| 00000000 00000000 | 11111111 11111111 | 00000000 10000000 | 00000000 11001011 |
| 3 | 2 | 1 | 0 |

Table 4 illustrates the in-register representation of packed multiply low operation on packed word data.

TABLE 4

| 11111111 11111111 | 11111111 00000000 | 11111111 00000000 | 00001110 00001000 |
|---|---|---|---|
| 3 | 2 | 1 | 0 |
| Multiply | Multiply | Multiply | Multiply |
| 00000000 00000000 | 00000000 00000001 | 10000000 00000000 | 00001110 10000001 |
| = | = | = | = |
| 00000000 00000000 | 11111111 00000000 | 00000000 00000000 | 10000000 00001000 |
| 3 | 2 | 1 | 0 |

PACKED DATA CIRCUITS

Figure 8:
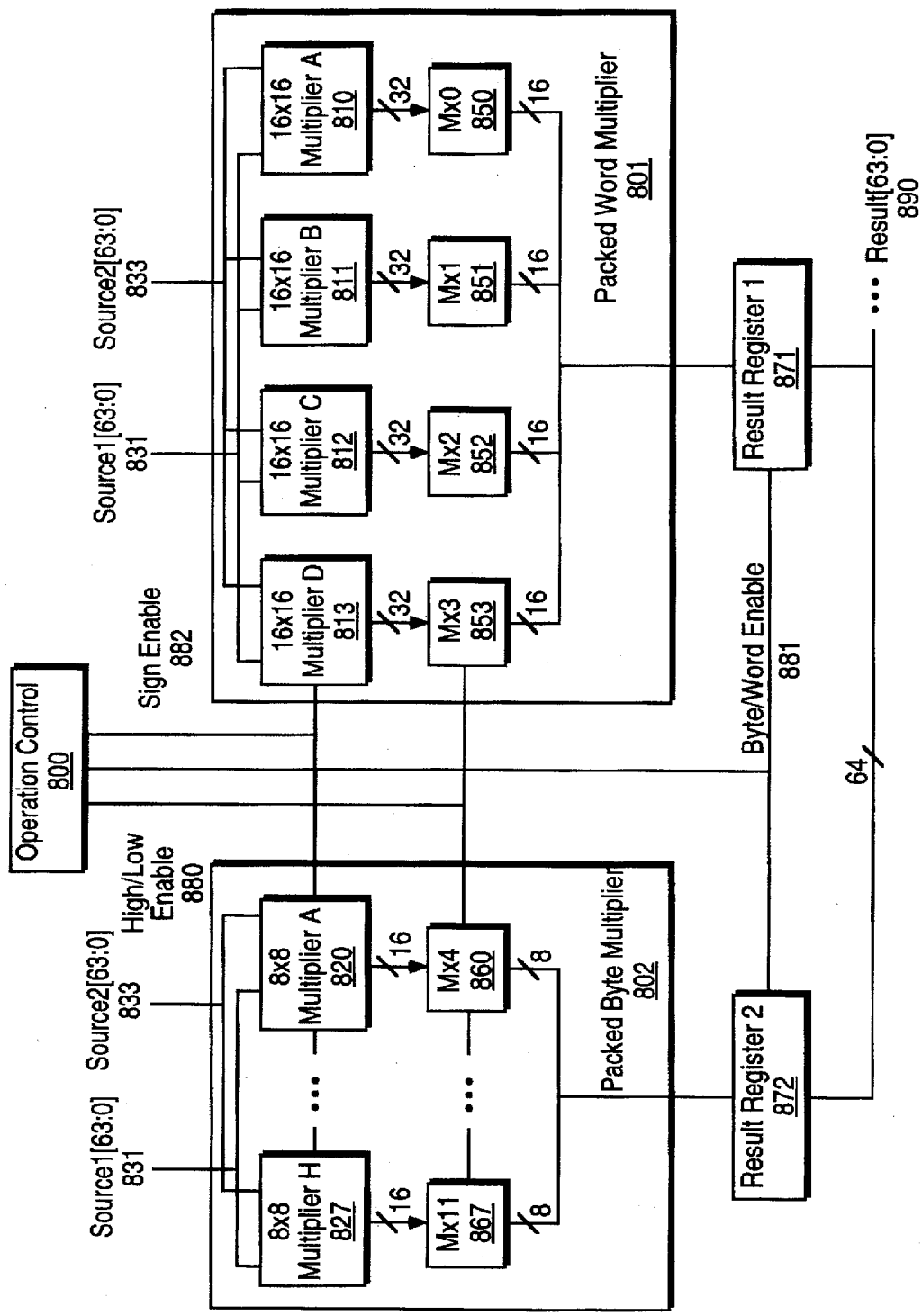
FIG. 8 illustrates a circuit capable of manipulating individual data elements of packed data.

In one embodiment, the multiply operation can occur on multiple data elements in the same number of clock cycles as a single multiply operation on unpacked data. To achieve execution in the same number of clock cycles, parallelism is used. That is, registers are simultaneously instructed to perform the multiply operation on the data elements. This is discussed in more detail below. FIG. 8 illustrates one embodiment of a circuit that can perform a multiply operation on packed data in the same number of clock cycles as a multiply operation on unpacked data.

FIG. 8 illustrates the use of multiplier circuits to perform packed byte or packed word multiplies. Operation control 800 controls the circuits performing the multiplication. Operation control 800 processes the control signal for the multiply operation and has the following outputs: highllow enable 880; byte/word enable 881 and sign enable 882. Highllow enable 880 identifies whether the high or low order bits of the product are to be included in the result. Byte/word enable 881 identifies whether a byte packed data or word packed data multiply operation is to be performed. Sign enable 882 indicates whether signed multiplication should be used.

Packed word multiplier 801 multiplies four word data elements simultaneously. Packed byte multiplier 802 multiplies eight byte data elements. Packed word multiplier 801 and packed byte multiplier 802 both have the following inputs: Source1[63:0]831, Source2[63:0]833, sign enable 882, and highllow enable 880.

Packed word multiplier 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1[15:0] and Source2[15:0]. 16×16 multiplier B 811 has as inputs Source1[31:16] and Source2[31:16]. 16×16 multiplier C 812 has as inputs Source1[47:32] and Source2[47:32]. 16×16 multiplier D 813 has as inputs Source1[63:48] and Source2[63:48]. Each 16×16 multiplier is connected to the sign enable 882. Each 16×16 multiplier produces a thirty-two bit product. For each multiplier, a multiplexor (Mx0 850, Mx1 851, Mx2 852 and Mx3 853 respectively) receives the thirty-two bit result. Depending on the value of the highllow enable 880, each multiplexor outputs the sixteen high order bits or the sixteen low order bits of the product. The outputs of the four multiplexors are combined into one sixty-four bit result. This result is optionally stored in a result register 1 871.

Packed byte multiplier 802 includes eight 8×8 multiplier circuits: 8×8 multiplier A 820 through 8×8 multiplier H 827. Each 8×8 multiplier has an eight bit input from each of Source1[63:0]831 and Source2[63:0]833. For example 8×8 multiplier A 820 has as inputs Source1[7:0] and Source2[7:0] while 8×8 multiplier H 827 has as inputs Source1[63:56] and Source2[63:56]. Each 8×8 multiplier is connected to the sign enable 882. Each 8×8 multiplier produces a sixteen bit product. For each multiplier, a multiplexor (e.g. Mx4 860 and Mx11 867) receives the sixteen bit result. Depending on the value of the highllow enable 880, each multiplexor outputs the eight high order bits or the eight low order bits of the product. The outputs of the eight multiplexors are combined into one sixty-four bit result. This result is optionally stored in a result register 2 872. The byte/word enable 881 enables the particular result register, depending on the size of the data element that the operation requires.

In one embodiment, the area used to realize the multiplies is reduced by making circuits that can multiply both two 8×8 numbers or one 16×16 number. That is, two 8×8 multipliers and one 16×16 multiplier are combined into one 8×8 and 16×16 multiplier. Operation control 800 would enable the appropriate size for the multiply. In such an embodiment, the physical area used by the multipliers would be reduced, however, it would be difficult to execute a packed byte multiply and a packed word multiply. In another embodiment supporting packed doubleword multiplies, one multiplier can perform four 8×8 multiplies, two 16×16 multiplies or one 32×32.

In one embodiment, only a packed word multiply operation is provided. In this embodiment, packed byte multiplier 802 and result register 2 872 would not be included.

Therefore, the packed multiply operation can operate on multiple data elements. In prior art processors, to multiply eight pieces of data, each one word long, four separate multiply operations would be needed. Each operation would multiply two words at a time, effectively wasting data lines and circuitry that are used for the bits that are higher than bit sixteen. As well, the entire product may not be of use to the programmer. Therefore, the programmer would have to truncate each product. Using the packed multiply operation, the eight pieces of data can be multiplied by the processor in one operation, if only the high order bits are important. In this embodiment, the data lines all carry relevant data.

A microprocessor having an improved data multiplication operation has been described.

What is claimed is:

1. A method for manipulating packed data implemented in a general purpose central processing unit, said method comprising the steps of:

a) decoding an instruction, the instruction identifying a first and second packed data respectively including a first plurality of data elements and a second plurality of data elements, wherein each data element in the first plurality of data elements corresponds to a data element in said second plurality of data elements, said instruction is operable to set length of said data elements, wherein said length is eight bits, sixteen bits, thirty-two bits, or sixty-four bits;

b) simultaneously multiplying, in response to the instruction, each data element of the first plurality of data elements with a corresponding data element from the second plurality of data elements to generate a plurality of result data elements in a third packed data, wherein each result data element include high order bits or low order bits.

2. The method of claim 1, wherein the data elements of the first, second, and third packed data are signed data elements.

3. A method for manipulating packed data implemented in a general purpose central processing unit, said method comprising the steps of:

a) decoding an instruction, the instruction identifying a first and second packed data respectively including a first plurality of data elements and a second plurality of data elements, wherein each data element in the first plurality of data elements corresponds to a data element in said second plurality of data elements, said instruction is operable to set length of said data elements, wherein said length is eight bits, sixteen bits, thirty-two bits, or sixty-four bits;

b) simultaneously multiplying, in response to the instruction, each data element of the first plurality of data elements with a corresponding data element from the second plurality of data elements to generate a plurality of result data elements in a third packed data, wherein the result data elements include low order bits or high order bits.

4. The method of claim 3, wherein the data elements of the first, second, and third packed data are signed or unsigned data elements.

5. A method, implemented on a general purpose central processing unit, for multiplying data elements in a first packed data with data elements in a second packed data in response to a single instruction, the first packed data and the second packed data respectively including a first plurality of data elements and a second plurality of data elements, the method comprising the steps of:

a) decoding the single instruction, said single instruction is operable to set a length of said data elements, wherein said length is eight bits, sixteen bits, thirty-two bits, or sixty-four bits;

b) reading the first packed data and reading the second packed data;

c) multiplying in parallel, in response to the single instruction, each data element in the first packed data with a corresponding data element in the second packed data; and d) generating a third packed data having a plurality of result data elements, each result data element including high order bits or low order bits.

6. The method of claim 5, wherein the data elements of the first, second, and third packed data are signed data elements.

7. The method of claim 5, wherein the data elements of the first, second, and third packed data are signed or unsigned data elements.

8. A method, implemented in a general purpose central processing unit, for performing multiplication operations in response to a single instruction in a computer system having placed therein a first packed data and a second packed data each containing a set of data elements, each of the data elements in the first packed data corresponds to a data element in the second packed data, said single instruction operable to set a length of said data elements, wherein said length is eight bits, sixteen bits, thirty-two bits, or sixty-four bits, the method comprising the computer implemented steps multiplying, in parallel, each data element in the first packed data with a corresponding data element of the second packed data to generate a set of result data elements; and saving the set of result data elements as a third packed data, wherein each result data element includes high order bits or low order bits.

* * * * *